(12) United States Patent
Rizzo et al.

(10) Patent No.: US 9,695,704 B2
(45) Date of Patent: Jul. 4, 2017

(54) HIGH DAMPING LABYRINTH SEAL WITH HELICOIDAL AND HELICOIDAL-CYLINDRICAL MIXED PATTERN

(71) Applicant: Nuovo Pignone Srl, Florence (IT)

(72) Inventors: Emanuele Rizzo, Florence (IT); Antonio Pelagotti, Florence (IT)

(73) Assignee: Nuovo Pignone Srl, Florence (IT)

( * ) Notice: Subject to any disclaimer, the term of this patent is extended or adjusted under 35 U.S.C. 154(b) by 284 days.

(21) Appl. No.: 14/395,869

(22) PCT Filed: Apr. 26, 2013

(86) PCT No.: PCT/EP2013/058801
§ 371 (c)(1),
(2) Date: Oct. 21, 2014

(87) PCT Pub. No.: WO2013/160469
PCT Pub. Date: Oct. 31, 2013

(65) Prior Publication Data
US 2015/0086343 A1 Mar. 26, 2015

(30) Foreign Application Priority Data
Apr. 27, 2012 (IT) .............................. CO2012A0019

(51) Int. Cl.
*F01D 11/02* (2006.01)
*F01D 11/08* (2006.01)
(Continued)

(52) U.S. Cl.
CPC .............. *F01D 11/02* (2013.01); *F01D 11/08* (2013.01); *F04D 29/102* (2013.01);
(Continued)

(58) Field of Classification Search
CPC ........ F01D 11/02; F01D 11/08; F04D 29/102; F04D 29/668; F04D 29/106; F04D 29/669; F16J 15/406; F16J 15/4472
See application file for complete search history.

(56) References Cited

U.S. PATENT DOCUMENTS 3,131,942 A    5/1964  Ertaud
3,468,548 A *  9/1969  Bosco, Jr. .............. F16J 15/406
                                                              277/348
(Continued)

FOREIGN PATENT DOCUMENTS

CN    201180789 Y    1/2009
CN    101925766 A    12/2010
(Continued)

OTHER PUBLICATIONS

Ha et al., "Leakage and Rotodynamic Analysis of Spiral-Grooved Pump Seal Based on Three-Control-Volume Theory", pp. 14-22, 2003.

(Continued)

*Primary Examiner* — Igor Kershteyn
(74) *Attorney, Agent, or Firm* — GE Global Patent Operation

(57) ABSTRACT

A device for sealing a high pressure region in a turbomachine from a low pressure region; the turbomachine has one or more statoric parts and one or more rotoric parts; the device comprises a labyrinth seal having a first plurality of grooves and a second plurality of grooves; the first plurality of grooves is disposed in a helical pattern and the second plurality of grooves is disposed in a cylindrical pattern; the labyrinth seal is disposed between at least one of the one or more rotoric parts of the turbomachine and at least one of the one or more statoric parts of the turbomachine between the high pressure region and the low pressure region of the turbomachine; the helical pattern has a helix angle less than (Continued)

or equal to 10°, wherein a stabilization effect of the turbomachine is obtained and leakage due to the second plurality of grooves is negligible.

20 Claims, 6 Drawing Sheets

(51) Int. Cl.
*F04D 29/10* (2006.01)
*F16J 15/40* (2006.01)
*F16J 15/44* (2006.01)
*F16J 15/447* (2006.01)
*F04D 29/66* (2006.01)

(52) U.S. Cl.
CPC ......... *F04D 29/106* (2013.01); *F04D 29/668* (2013.01); *F04D 29/669* (2013.01); *F16J 15/406* (2013.01); *F16J 15/44* (2013.01); *F16J 15/4472* (2013.01)

(56) References Cited

U.S. PATENT DOCUMENTS

| | | | | |
|---|---|---|---|---|
| 3,617,068 | A * | 11/1971 | Sprenger | F01D 11/04 277/422 |
| 3,700,247 | A * | 10/1972 | Butler | B29C 47/0808 159/2.2 |
| 4,273,510 | A * | 6/1981 | Ambrosch | F01D 11/08 415/110 |
| 4,420,161 | A | 12/1983 | Miller | |
| 4,645,213 | A * | 2/1987 | Washimi | F16J 15/406 277/347 |
| 5,322,298 | A * | 6/1994 | Maier | F16J 15/441 277/430 |
| 5,503,407 | A * | 4/1996 | McNickle | F16J 15/002 277/348 |
| 6,039,535 | A | 3/2000 | Kobayashi et al. | |
| 6,368,077 | B1 | 4/2002 | Meyerkord et al. | |
| 8,915,705 | B2 | 12/2014 | Eelman | |
| 2004/0056423 | A1 * | 3/2004 | Staljanssens | F04C 27/009 277/305 |
| 2009/0058013 | A1 | 3/2009 | Bulgrin et al. | |
| 2010/0253005 | A1 | 10/2010 | Liarakos et al. | |

FOREIGN PATENT DOCUMENTS

| | | |
|---|---|---|
| GB | 816762 A | 7/1959 |
| GB | 816792 A | 7/1959 |
| GB | 1505534 A | 3/1978 |
| GB | 1515857 A | 6/1978 |
| GB | 2447892 A | 10/2008 |
| JP | 5146655 A | 4/1976 |
| JP | 5564172 A | 5/1980 |
| JP | 58222902 A | 12/1983 |
| JP | 0323699 U | 3/1991 |
| JP | 2004019490 A | 1/2004 |
| JP | 2010106779 A | 5/2010 |
| RU | 2146343 C1 | 3/2000 |
| SU | 385114 A1 | 5/1973 |
| WO | 0216740 A1 | 2/2002 |

OTHER PUBLICATIONS

Ishimaru et al., "The Effect of Swirl Braked Grooved Seals on the Stability and the Unbalance Response of a Flexible Rotor", Journal of System Design and Dynamics, Volume No. 2, Issue No. 2, pp. 572-584, 2008.

Italian Search Report and Written Opinion issued in connection with corresponding IT Application No. CO2012A000019 dated Jan. 24, 2013.

International Search Report and Written Opinion issued in connection with corresponding PCT Application No. PCT/EP2013/058801 dated Aug. 6, 2013.

Unofficial English Translation of Chinese Office Action issued in connection with corresponding CN Application No. 201380022346.5 on Nov. 27, 2015.

Russian Notice of Allowance issued in connection with corresponding RU Application No. 2014141998 on Jan. 24, 2017.

Japanese Search Report issued in connection with corresponding JP Application No. 2015507557 on Jan. 31, 2017.

Unofficial English Translation of Japanese Office Action issued in connection with JP Application No. 2015507557 on Feb. 14, 2017.

* cited by examiner

HIGH DAMPING LABYRINTH SEAL WITH HELICOIDAL AND HELICOIDAL-CYLINDRICAL MIXED PATTERN

BACKGROUND

Embodiments of the subject matter disclosed herein generally relate to turbomachines, and more particularly, to devices and methods for improving rotordynamics in turbomachines.

Labyrinth seals are commonly used in order to minimize leakages from high pressure regions to low pressure regions in turbomachines such as pumps, centrifugal compressors, and turbines. Labyrinth seals include a number of grooves or teeth that form a tortuous path, or "labyrinth" between a stationary portion, or "stator," and a rotating portion, or "rotor," of the turbomachine. Labyrinth seals may be statoric, in which the teeth are formed on the stator, or rotoric, in which the teeth are formed on the rotor. The grooves or teeth of the labyrinth seal and opposing surface impede the flow of fluids from the high pressure region to the low pressure region through the labyrinth seal. However, a space or clearance is necessary between the labyrinth grooves or teeth and an opposing surface to allow rotation of the rotor. Thus, although labyrinth seals impede fluid flow, the clearance allows highly pressurized fluid from the high pressure region to leak through the clearance to the low pressure region due to a pressure differential across the labyrinth seal. Labyrinth seals in general are designed to contain this leakage.

Leakage flow through the labyrinth seal may be reduced by decreasing the clearance. To this end, abradable labyrinth seals have been developed. Abradable labyrinth seals are rotoric labyrinth seals in which a statoric portion that opposes the rotoric teeth is formed of an abradable material. Clearances in abradable labyrinth seals may be made very small because when the rotoric teeth rub against the abradable stator such as occurs, for example, due to rotoric vibration during transient conditions, the rotoric teeth cut into the abradable material of the stator, thereby increasing the clearance. Abradable labyrinth seals are practically not applicable in high pressure centrifugal compressors because of their high destabilizing effects. The seal contribution to instability is related to the possibility to create a gas annulus, along the circumferential direction, rotating together with the rotoric part. Those small gaps favorite to keep the gas trapped into the circumferential path with higher destabilizing effects.

Although small clearances in both statoric and rotoric labyrinth seals can reduce leakage, they also negatively influence rotor stability due to inlet swirl at the entrance to the labyrinth seal and circumferential flow created inside the labyrinth seal by centrifugal force due to rotation. In an attempt to improve rotor stability, labyrinth seals in turbomachines have been modified with swirl brakes or equipped with shunt holes. For example, statoric impeller eye labyrinths are usually modified to include swirl brakes and balance drums are usually equipped with shunt holes. However, these devices can be difficult to implement and introduce additional costs in the manufacture and design phases of the turbomachines. Furthermore, no devices are currently available to stabilize rotoric labyrinth seals on impeller eyes.

Accordingly, it would be desirable to provide systems and methods for improving rotordynamics in turbomachines simply and cost-effectively.

In particular, from a mechanical point of view, in high pressure centrifugal compressors, the presence of high differential pressures requires mechanically stiff seals with high strength capabilities. For these reasons labyrinth seals in centrifugal compressors are machined starting from an aluminum or steel ring instead of assembling small annular ribs to create a single chamber as it is done in the turbines. At the same time, the presence of gas contaminants typical of oil and gas industry as $H_2S$, $CO_2$ and others together with the need of employing high reliable and referenced solutions, leads to the use of well-known materials with high mechanical properties both in terms of stress strength and corrosion resistance (typically aluminum and steels).

The present invention aims at improving the actual design of labyrinth seals in high pressure centrifugal compressors and at giving a new solution solving both the need of stability and sealing capabilities together with the use of well-known materials.

SUMMARY OF INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one exemplary embodiment, there is a device for sealing a high pressure region in a turbomachine from a low pressure region in the turbomachine, the turbomachine having one or more statoric parts and one or more rotoric parts. The device includes a labyrinth seal having a first plurality of grooves and a second plurality of grooves. The first plurality of grooves is disposed in a helical pattern and the second plurality of grooves is disposed in a cylindrical pattern. The labyrinth seal is disposed between at least one of the one or more rotoric parts of the turbomachine and at least one of the one or more statoric parts of the turbomachine between the high pressure region and the low pressure region of the turbomachine. According to another exemplary embodiment, the labyrinth seal described in the paragraph above includes a first rotoric portion on which the first plurality of grooves disposed in the helical pattern is formed and a second rotoric portion disposed adjacent to the first rotoric portion and on which the second plurality of grooves disposed in the cylindrical pattern is formed. The first rotoric portion is disposed on the at least one of the one or more rotoric parts of the turbomachine in the high pressure region of the turbomachine. The second rotoric portion is disposed on the at least one of the one or more rotoric parts of the turbomachine in the low pressure region of the turbomachine.

The first rotoric portion and the second rotoric portion are disposed opposite to and in sealing relation with the at least one of the one or more statoric parts of the turbomachine. The first rotoric portion may rotate in a same direction as a direction of rotation of the second rotoric portion or a direction opposite a direction of rotation of the second rotoric portion. A statoric portion coated in an abradable material may be disposed on the at least one or more statoric parts of the turbomachine opposite to and in sealing relation with the first and second rotating portions of the labyrinth seal.

According to another exemplary embodiment, the labyrinth seal described in the first paragraph of the "Summary" section above includes a statoric portion disposed on the at least one of the one or more statoric parts of the turbomachine between the high pressure region and the low pressure region of the turbomachine. The first plurality of grooves is formed on the statoric portion in the high pressure region of the turbomachine, the second plurality of grooves is formed adjacent to the first plurality of grooves on the statoric portion in the low pressure region of the turbomachine, and the statoric portion is disposed opposite to and in sealing relation with the at least one of the one or more rotoric parts of the turbomachine. A rotoric portion may be disposed on the at least one or more rotoric parts of the turbomachine opposite the statoric portion of the labyrinth seal.

According to another exemplary embodiment there is a device for sealing a high pressure region in a turbomachine from a low pressure region in the turbomachine according to any of the three paragraphs above, in which the labyrinth seal does not include swirl brakes in the plurality of grooves.

According to another exemplary embodiment there is a device for sealing a high pressure region in a turbomachine from a low pressure region in the turbomachine, the turbomachine having one or more statoric parts and one or more rotoric parts. The device includes a labyrinth seal having a plurality of grooves disposed in a helical pattern, wherein the labyrinth seal does not include swirl brakes in the plurality of grooves. The labyrinth seal is disposed between at least one of the one or more rotoric parts of the turbomachine and at least one of the one or more statoric parts of the turbomachine between the high pressure region and the low pressure region of the turbomachine. According to another exemplary embodiment, there is a method for sealing a high pressure region in a turbomachine from a low pressure region in the turbomachine, the turbomachine having one or more statoric parts and one or more rotoric parts. The method includes forming a labyrinth seal having a plurality of grooves disposed in a helical pattern, wherein no swirl brakes are formed in the plurality of grooves and forming the labyrinth seal between at least one of the one or more statoric parts and at least one of the one or more rotoric parts of the turbomachine and between the high pressure region and the low pressure region of the turbomachine. Forming the labyrinth seal may include forming a first rotoric portion on the at least one of the one or more rotoric parts opposite at least one of the one or more statoric parts of the turbomachine in the high pressure region of the turbomachine, forming the plurality of grooves in the helical pattern on the first rotoric portion, forming a second rotoric portion adjacent to the first rotoric portion on the at least one of the one or more rotoric parts opposite at least one of the one or more statoric parts of the turbomachine in the low pressure region of the turbomachine, and forming a second plurality of grooves in a cylindrical pattern on the second rotoric portion of the labyrinth seal. Forming the first rotoric portion and forming the second rotoric portion may include forming the first rotoric portion to rotate in a same direction as a direction of rotation of the second rotoric portion or in a direction opposite a direction of rotation of the second rotoric portion. A statoric portion coated in an abradable material may be formed on the at least one or more statoric parts of the turbomachine opposite to and in sealing relation with the first and second rotating portions of the labyrinth seal.

According to another exemplary embodiment, there is a method for sealing a high pressure region in a turbomachine from a low pressure region in the turbomachine, the turbomachine having one or more statoric parts and one or more rotoric parts. The method includes forming a labyrinth seal having a plurality of grooves disposed in a helical pattern, wherein no swirl brakes are formed in the plurality of grooves and forming the labyrinth seal between at least one of the one or more statoric parts and at least one of the one or more rotoric parts of the turbomachine and between the high pressure region and the low pressure region of the turbomachine. Forming the labyrinth seal includes forming a statoric portion on the at least one of the one or more statoric parts opposite and in sealing relation with the at least one of the one or more rotoric parts of the turbomachine, and forming the plurality of grooves in the helical pattern on the statoric portion.

A very important technical feature of the present invention and all its embodiments is the plurality of groves having a helical pattern; it is worth noting that such grooves have not to be confused con swirl brakes, in particular protrusions acting as swirl brakes. In an embodiment, the helical pattern has a helix angle less than or equal to 10°, in an embodiment, between 0.5° and 5°; therefore, a stabilization effect of the turbomachine is obtained and leakage due to the plurality of grooves with helical pattern is negligible.

In an embodiment, the plurality of helical-pattern grooves consists of at least five grooves.

In some embodiments, the plurality of helical-pattern grooves is adjacent to a plurality of cylindrical-pattern grooves; in this case, the plurality of helical-pattern grooves is directly adjacent to a plurality of cylindrical-pattern grooves

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a centrifugal compressor. However, the embodiments to be discussed next are not limited to such a system, but may be applied (with appropriate adjustments) to other systems of turbomachines such as expanders, pumps and turbines.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
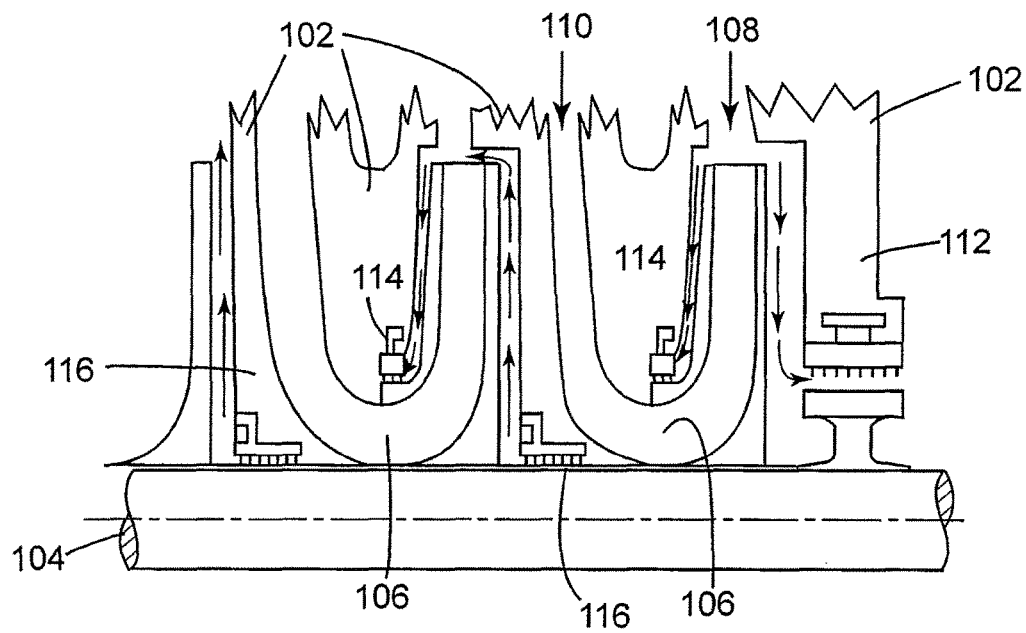
FIG. 1 is a schematic diagram of a cross-section of a portion of an exemplary turbomachine.

FIG. 1 is a schematic diagram of a cross-section of a portion of an exemplary turbomachine. The turbomachine shown in FIG. 1 is a centrifugal compressor 100 in which devices and methods for sealing a high pressure region from a low pressure region in a turbomachine as disclosed herein may be implemented. Centrifugal compressor 100 is described herein by way of example only and is not intended to limit the present invention. Persons skilled in the relevant art(s) will readily appreciate that the present invention may be implemented in other types of compressors or in other types of turbomachines entirely.

The centrifugal compressor 100 includes a housing 102, a rotatable shaft 104 and a plurality of impellers 106 secured to the rotatable shaft 104. Fluid enters each impeller 106 in turn. The impellers 106 impart kinetic energy to the fluid increasing the velocity of the fluid. Diffusers 108 convert the kinetic energy of the fluid into pressure by gradually slowing the velocity of the fluid. Eye labyrinth seals 114 are disposed on impeller eyes and shaft labyrinth seals 116 are disposed on the spacers 118 mounted on rotating shaft 104 between the impellers 106 or on the impeller feet. The centrifugal compressor 100 further includes a balance piston 119 to provide a counteracting axial thrust to an axial thrust of the rotatable shaft 104 caused by the impellers 106. A balance piston labyrinth seal 112 is disposed on the balance piston. Each of the eye labyrinth seals 114, shaft labyrinth seals 116 and balance piston labyrinth seal 112 seals a region of high pressure from a region of low pressure in the compressor 100. As explained in further detail below, each of the labyrinth seals 112, 114 and 116 can have a significant impact on rotordynamic stability in the centrifugal compressor 100. It is to be understood that the centrifugal compressor 100 as shown in FIG. 1 is meant to be exemplary only and may include fewer or more components.

Figure 2:
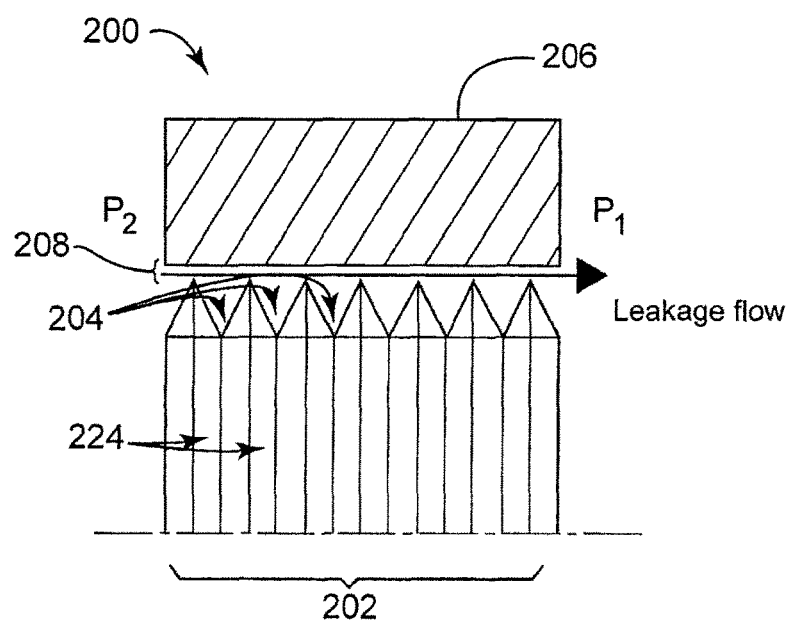
FIG. 2 is a schematic diagram of a cross-section of an exemplary labyrinth seal.

FIG. 2 illustrates an example of a labyrinth seal 200 that may be used to seal a high pressure region P2 from a low pressure region P1 in a turbomachine. The labyrinth seal 200 includes a rotoric portion 202 having a plurality of grooves 204 disposed in a cylindrical pattern formed thereon, and a statoric portion 206 disposed opposite the rotoric portion. A space or clearance 208 is provided between the statoric portion 206 and the rotoric portion 202 to allow rotation of the rotoric portion 202. The rotoric portion 202 together with the statoric portion 206 form a no-contact seal between the high pressure region P2 and the low pressure region P1. In the labyrinth seal 202 of FIG. 2, the statoric portion 206 may be made of an abradable material. Thus, the clearance 208 between the statoric portion 206 and the rotoric portion 202 may be made small since, if teeth 224 on the rotoric portion 202 rub against the abradable material of the statoric portion 206, such as during transient conditions, e.g., startup, shutdown, or load swings, etc., the teeth 224 form grooves in the abradable material thereby increasing the clearance 208.

Although small clearances in labyrinth seals can reduce leakage, they also negatively influence rotor stability due to inlet swirl at the entrance to the labyrinth seal and circumferential flow created inside the labyrinth seal by centrifugal force due to rotation, as described in greater detail below with respect to FIGS. 3A and 3B.

Figure 3A:
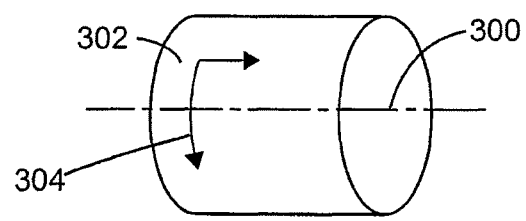
FIGS. 3A and 3B are schematic diagrams illustrating leakage flow in the labyrinth seal of FIG. 2.
Figure 3B:
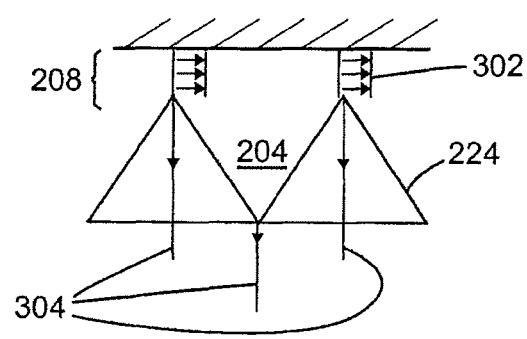

FIGS. 3A and 3B are schematic diagrams illustrating leakage flow in a labyrinth seal of the type 200 shown in FIG. 2. As shown in FIGS. 3A and 3B, highly pressurized fluid entering the labyrinth seal 200 flows in an axial direction 302 of a rotor 300 from a high pressure region to a low pressure region and includes a circumferential flow component 304, or swirl, due to rotor 300 rotation, that flows in a direction of rotation around the circumference of the rotor 300. The circumferential flow component 304 flows into the grooves 204 of the labyrinth seal 200 and directly influences rotordynamic stability. The swirl at the inlet to the labyrinth seal ("inlet swirl") can induce forces in the labyrinth seal that often lead to self-excited lateral vibrations of the labyrinth seal. The destabilizing forces in the labyrinth seal are primarily due to the inlet swirl and circumferential flow velocity. The destabilizing forces in the labyrinth seal are increased by smaller clearances. Decreasing the clearances increases inlet swirl and circumferential pressure distribution, which can lead to rotor instability. Therefore, there is a trade-off between reduced leakages and rotor stability in labyrinth seals. However, when a rotor is unstable, it will typically require immediate shutdown of the turbomachine to avoid catastrophic failure. Hence, rotordynamic stability is necessary for proper operation of turbomachines.

As previously described, attempts have been made to decrease the velocity of the swirl at the inlet to the labyrinth seal by adding one or more swirl brakes in or before the labyrinth seal. Swirl brakes can eliminate the circumferential flow and decrease the inlet swirl velocity. Shunt holes, in which divergence paths are machined into the seals for diverging high pressure fluid flow, have also been used with some success to decrease the inlet swirl velocity. However, the addition of swirl brakes and shunt holes are complicated (e.g., complex drilling required for shunt holes) and introduce additional manufacturing and design costs.

Embodiments disclosed herein aim to provide a low cost solution to improve rotordynamic stability. An embodiment for improving rotordynamic properties in turbomachines will now be described with respect to FIG. 4.

Figure 4:
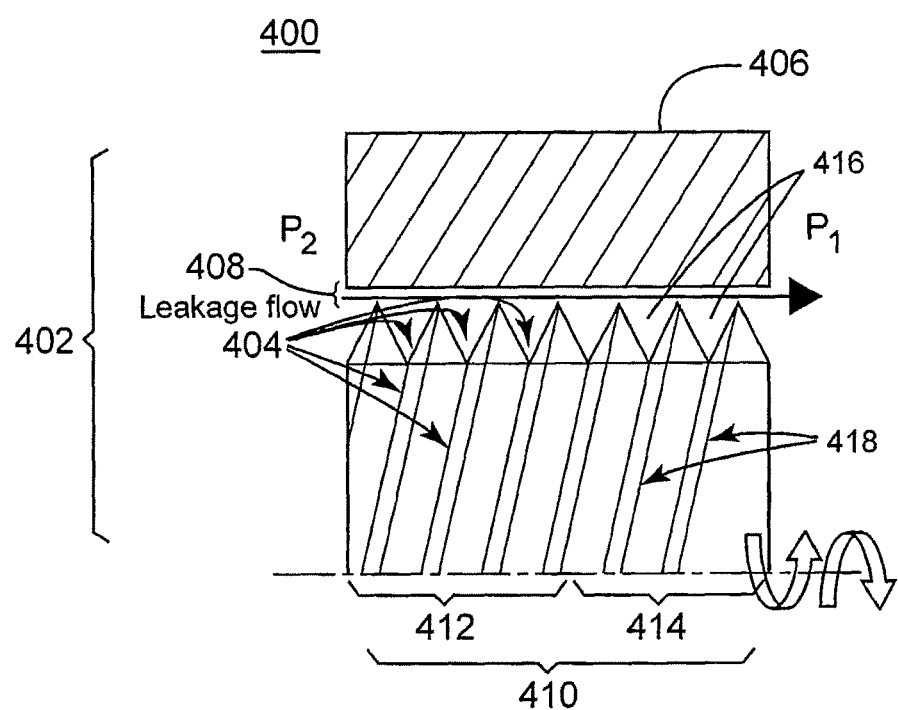
FIG. 4 is a schematic diagram of a cross-section of a device for sealing a high pressure region from a low pressure region in a turbomachine according to an exemplary embodiment.

FIG. 4 is a schematic diagram of a cross-section of a device 400 for sealing a high pressure region P2 from a low pressure region P1 in a turbomachine according to an exemplary embodiment. The device 400 may be implemented in any type of turbomachine in which a connection between a high pressure region and a low pressure region exists. For example, device 400 may be implemented in a centrifugal compressor such as the centrifugal compressor 100 shown in FIG. 1, or a centrifugal compressor having more or fewer parts, or an expander, a turbine, a pump, etc.

Figure 8:
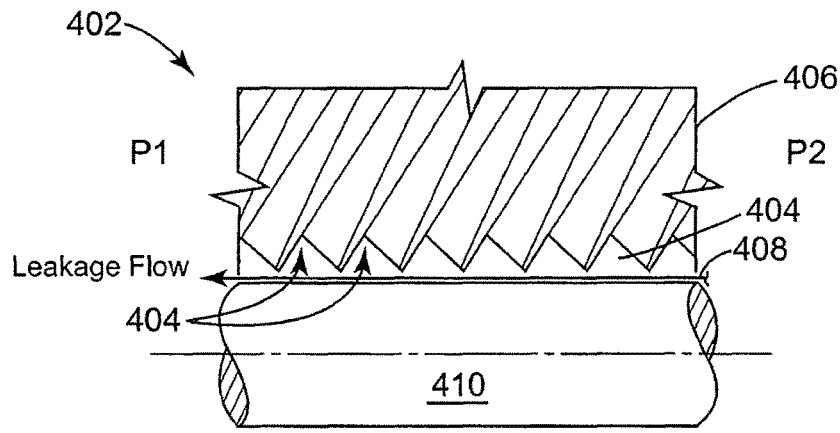
FIG. 8 is a schematic diagram of a cross-section of a modification of a device for sealing a high pressure region from a low pressure region in a turbomachine according to exemplary embodiments.

The device 400 includes a labyrinth seal 402 having a plurality of grooves 404 disposed in a helical pattern formed thereon. Incorporation of the helically formed grooves 404 produces stabilizing effects in the device 400 as will be described further herein below. Therefore, no swirl brakes are included in or before the plurality of grooves 404 in the labyrinth seal 402. In the embodiment shown in FIG. 4, the labyrinth seal 402 includes a rotoric portion 410 on which the plurality of grooves 404 is formed. However, in other embodiments, the plurality of grooves 404 may be formed on a statoric portion of a labyrinth seal such as shown in FIG. 8.

The plurality of grooves 404 disposed in the helical pattern may, in principle, have a negative or a positive helix angle (the helix angle is the angle of inclination of the thread to a plane perpendicular to the axis of the seal).

In particular, leakage in the labyrinth seal is function of the helix angle, with a minimum when the helix angle is close to 0° (cylindrical pattern). The cross coupling stiffness is a decreasing function of helix angle; therefore, a helical seal leaks a bit more than a cylindrical one but gives less destabilizing effects. Furthermore, leakage in the labyrinth seal is function of the number of grooves: the higher the number the lower the leakage.

The annular gas path is maximum when the helix angle is 0° (i.e. cylindrical teeth path) with subsequent maximum gas swirl and maximum destabilizing effects. At the same time, the surface where are acting aerodynamic forces is an increasing function of the helix angle (increasing destabilizing effects), therefore an optimum angle shall exist where the destabilizing effects are minimum.

Values of the helix angle lower than 30° provide high stability and low leakage, while values higher than 30° are not acceptable from the leakage standpoint.

The plurality of grooves 404 may be machined or otherwise formed such that portions of higher elevation (referred to hereinafter as "teeth" 418) formed between and by the grooves have a profile consistent with any requirements of an application of the device. For example, the tooth profile may be squared, trapezoidal, triangular, or any other shape that may be beneficial to a particular application of the device. The plurality of grooves 404 may be machined in the rotoric portion 410 of the labyrinth seal 402 using any known or as yet to be discovered methods and/or devices capable of forming the grooves in a helical pattern having the desired helix angle and the desired tooth profile.

The device 400 further includes a statoric portion 406 disposed opposite and in sealing relation with the rotoric portion 410 having the plurality of grooves 404 formed thereon. A clearance 408 is provided between the statoric portion 406 and the rotoric portion 410 to allow rotation of the rotoric portion 410. The statoric portion 406 may be included as part of the labyrinth seal 402 or the device 400, such as in a "housing" or "packing" (not shown). Alternatively, the statoric portion 406 may be formed as an integral part of a turbomachine, such as a pump casing or housing, or any other statoric part of the turbomachine between a high pressure region and a low pressure region in the turbomachine. In such a case, the rotoric labyrinth seal 402 may be disposed directly opposite the statoric portion 406 of the turbomachine. In some embodiments in which the statoric portion 406 is included as part of the labyrinth seal 402 or the device 400, the statoric portion 406 may be made of an abradable material, or, alternatively, in some other embodiments, the statoric portion 406 may have an abradable coating formed on a surface 416 thereof disposed opposite and in sealing relation with the rotoric portion 410. When the statoric portion 406 is made of an abradable material or has an abradable coating formed thereon, the clearance 408 between the rotoric portion 410 and the statoric portion 406 may be reduced because if teeth 418 of the rotoric portion 402 bump or rub against the surface 416 of the statoric portion 406 such as, for example, during periods of transient conditions such as startup, shutdown, or load swings causing whirl or vibrations in the rotoric portion 402, the teeth 418 will etch grooves into the abradable material of the statoric portion 406 or surface 416 of the statoric portion 406, thereby increasing the clearance 408.

The labyrinth seal 402 of FIG. 4 may be disposed between at least one rotoric part of a turbomachine and at least one statoric part of the turbomachine between a high pressure region and a low pressure region of the turbomachine. For example, the statoric portion 406 may be formed on one or more statoric parts of the turbomachine, and the rotoric portion 410, the first rotoric portion 412 and/or the second rotoric portion 414 may be formed on one or more rotoric parts of the turbomachine. The rotoric portion(s) 410, 412, 414 in conjunction with the statoric portion 406 seal the high pressure region P2 of the turbomachine from the low pressure region P1 of the turbomachine. For example the rotoric portion(s) 410, 412, 414 and the statoric portion 406 may be disposed on parts of a turbomachine to provide sealing for impeller eyes, balance drums, etc.

It is to be understood that any statoric or rotoric portions of the labyrinth seal 402 or the device 400 "formed on" any statoric or rotoric parts of the turbomachine may be formed integrally to those parts by any means or other manufacturing technologies known or as yet to be discovered in the art(s). Another embodiment for improving rotordynamic properties in turbomachines will now be described with respect to FIG. 5.

Figure 5:
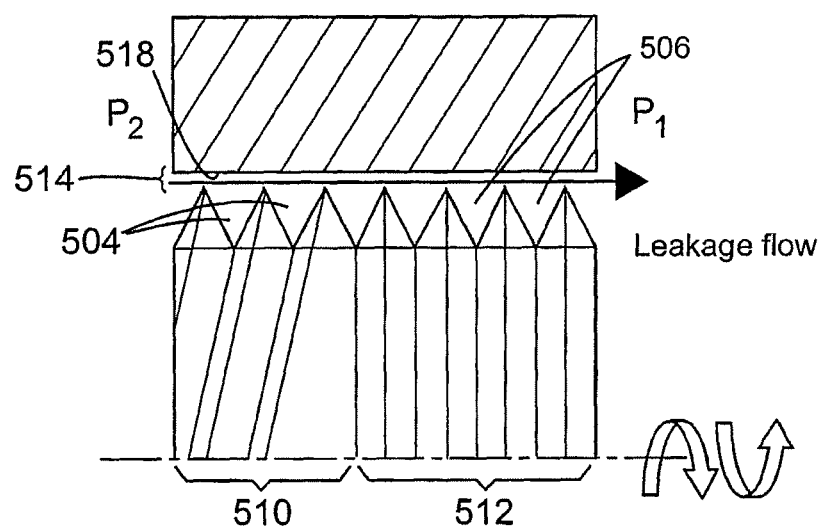
FIG. 5 is a schematic diagram of a cross-section of a device for sealing a high pressure region from a low pressure region in a turbomachine according to another exemplary embodiment.

FIG. 5 is a schematic diagram of a cross-section of device 500 for sealing a high pressure region P2 from a low pressure region P1 in a turbomachine according to another exemplary embodiment. The device 500 may be implemented in any type of turbomachine in which a connection between a high pressure region and a low pressure region exists. For example, the device 500 may be implemented in a centrifugal compressor such as the centrifugal compressor 100 shown in FIG. 1, or a centrifugal compressor having more or fewer parts, or a turbine, a pump, etc.

The device 500 includes a labyrinth seal 502 having a first plurality of grooves 504 disposed in a helical pattern and a second plurality of grooves 506 disposed in a cylindrical pattern adjacent to the first plurality of grooves 504. Incorporation of the helically formed grooves 504 produces stabilizing effects in the device 500 as will be described further herein below. Therefore, no swirl brakes are included in or before the first plurality of grooves 504 and the second plurality of grooves 506 in the labyrinth seal 502. The labyrinth seal 502 may be disposed between at least one rotoric part of a turbomachine and at least one statoric part of the turbomachine between a high pressure region and a low pressure region in the turbomachine. The labyrinth seal 502 includes a first rotoric portion 510 disposed in a high pressure region of a turbomachine and a second rotoric portion 512 disposed adjacent to the first rotoric portion 510 in a low pressure region of the turbomachine. The first plurality of grooves 504 disposed in the helical pattern is formed on the first rotoric portion 510 in the high pressure region of the turbomachine and the second plurality of grooves 506 disposed in the cylindrical pattern is formed on the second rotoric portion 512 in the low pressure region of the turbomachine.

In the embodiment of FIG. 5, the helical pattern has a helix angle less than or equal to 10°, in an embodiment, between 0.5° and 5°; therefore, a stabilization effect of the turbomachine is obtained and leakage due to the plurality of helix-pattern grooves is negligible. The plurality of helix-pattern grooves 510 consists of at least five grooves. The plurality of helix-pattern grooves 510 is adjacent to the plurality of cylindrical-pattern grooves 512; in an embodiment, as shown in FIG. 5, the plurality of helix-pattern grooves is directly adjacent to the plurality of cylindrical-pattern grooves.

In an embodiment, the plurality of helix-pattern grooves and the plurality of cylindrical-pattern grooves are both associated either to said rotoric parts or said statoric parts; in the embodiment of FIG. 5, they are both associated to a rotoric part.

The labyrinth seal has a first clearance in the zone where the plurality of helix-pattern grooves 510 are located and has a second clearance in the zone where the plurality of cylindrical-pattern grooves 512 are located; in an embodiment, the ratio between the first clearance and the second clearance is less than or equal to 2 and more than or equal to 0.5. In an embodiment of FIG. 5, this ratio is approximately equal to 1.

The plurality of grooves 504 disposed in the helical pattern may have, in principle, clockwise or counterclockwise.

Unexpected results in term of stability and leakage have been obtained, for compressors with delivery pressure up to 150 bar, combining said first plurality of grooves 504 disposed in a helical pattern with said second plurality of grooves 506 disposed in a cylindrical pattern, wherein the helix angle of the helical pattern is comprised between 0.5° and 10°, particularly between 0.5° and 5°.

Moreover, in order to limit leakage between a high pressure region and a low pressure region in the centrifugal compressor, the number of grooves (or teeth) has to be, in an embodiment, at least 5 teeth.

The first plurality of grooves 504 and the second plurality of grooves 506 may be machined or otherwise formed such that portions of higher elevation (referred to hereinafter as "teeth") formed between and by the grooves have a profile consistent with any requirements of an application of the device. For example, the tooth profile may be squared, trapezoidal, triangular, or any other shape that may be beneficial to a particular application of the device. The first plurality of grooves 504 first and second plurality of grooves 506 may be machined or otherwise formed in the first rotoric portion 510 and the second rotoric portion 512 of the labyrinth seal 502, respectively, using any known or as yet to be discovered methods and/or devices capable of forming the grooves 504 in the helical pattern having the desired helix angle and the desired tooth profile, and the grooves 506 in the cylindrical pattern having the desired tooth profile, respectively.

The device 500 further includes a statoric portion 508 disposed opposite to and in sealing relation with the first rotoric portion 510 having the first plurality of grooves 504 formed thereon and the second rotoric portion 512 having the second plurality of grooves 506 formed thereon. A clearance 514 is provided between the statoric portion 508 and first and second rotoric portions 510, 512 to allow rotation of the rotoric portions 510, 512. The statoric portion 508 may be included as part of the labyrinth seal 502 or the device 500, such as in a "housing" or "packing" (not shown). Alternatively, the statoric portion 506 may be an integral part of a turbomachine, such as a pump casing or housing, or any other statoric part of the turbomachine between a high pressure region and a low pressure region in the turbomachine. In such a case, the rotoric labyrinth seal 502 may be disposed directly opposite the statoric portion 508 of the turbomachine. In some embodiments in which the statoric portion 508 is a part of the labyrinth seal 502 or a part of the device 500, the statoric portion 508 may be made of an abradable material, or alternatively, the statoric portion 508 may have an abradable coating formed on a surface 518 thereof disposed opposite to and in sealing relation with the first rotoric portion 510 and the second rotoric portion 512. In embodiments in which the statoric portion 508 is made of an abradable material or has an abradable coating formed on a surface 518 thereof, the clearance 514 may be reduced.

Although the first plurality of grooves 504 disposed in a helical pattern is shown in FIG. 5 having three helically formed grooves, this number is merely exemplary and is not intended to be limiting. For example, the first plurality of grooves 504 may include four, five, six, or any other number of helically formed grooves. Likewise, the second plurality of grooves 506 disposed in the cylindrical pattern may include any number of cylindrically formed grooves.

Figure 9A:
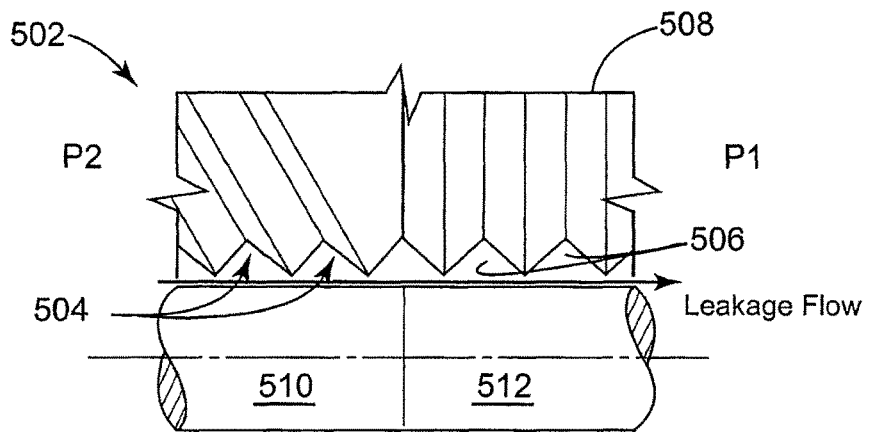
FIGS. 9A and 9B are schematic diagrams of a cross-section of a modification of a device for sealing a high pressure region from a low pressure region in a turbomachine according to exemplary embodiments.

Although in the embodiment shown in FIG. 5, the first plurality of grooves 504 is formed on the first rotoric portion 510, and the second plurality of grooves 506 is formed on the second rotoric portion 512, it is to be understood that, in some other embodiments, the first and second plurality of grooves 504, 506 may be formed on the statoric portion 508 of the labyrinth seal such as shown in FIG. 9A.

It is also to be understood that any statoric or rotoric portions of the labyrinth seal 502, or the device 500 "formed on" any statoric or rotoric parts of the turbomachine may be formed integrally to those parts by any additive or subtractive means or other manufacturing technologies known or as yet to be discovered in the art(s).

Figure 9B:
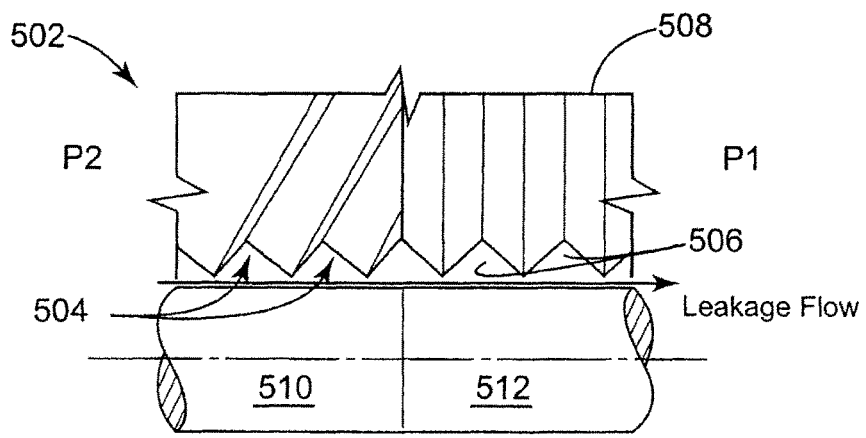

It is also to be understood that the first and the second plurality of grooves can be composed of two different parts: one with the first pattern and another one with the second pattern (FIG. 9B). This solution can be applicable both for the rotoric and for the statoric arrangement and mixed in all possible combinations (FIG. 9B).

Incorporation of the second plurality of grooves 506 disposed in a cylindrical pattern in addition to the first plurality of grooves 504 disposed in the helical pattern in the labyrinth seal 504 reduces leakage in the labyrinth seal 502 in addition to providing stabilizing effects by the formation of the helical grooves, as will be described further herein below in with respect to FIGS. 6A and 6B, in which a method of operation of the device 500 is described.

A method of operation of the devices 400, 500 will now be described with respect to FIGS. 6A and 6B. FIGS. 6A and 6B are schematic diagrams illustrating flow components in the devices of 400, 500 of FIGS. 4 and 5 when disposed between at least one rotoric part of a turbomachine and at least one statoric part of the turbomachine between a high pressure region and a low pressure region of the turbomachine.

Figure 6A:
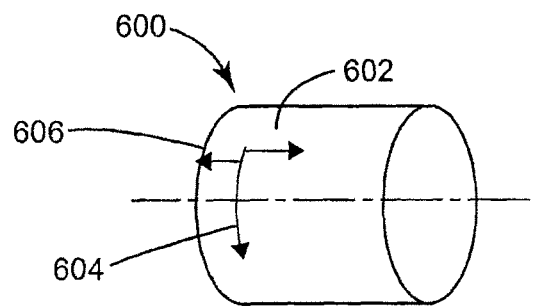
FIGS. 6A and 6B are schematic diagrams illustrating flow components in exemplary embodiments.
Figure 6B:
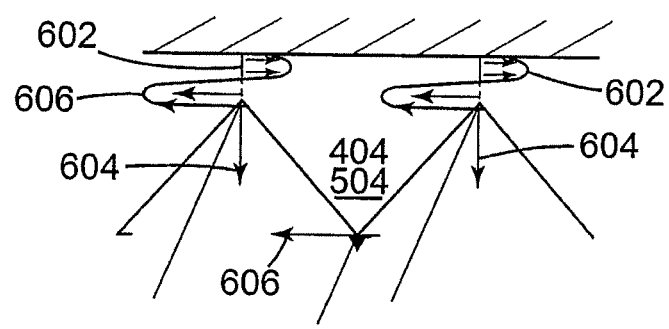

As shown in FIGS. 6A and 6B (and with respect to FIGS. 4 and 5), due to the pressure differential across the seal 402, 502, a main flow 602 of highly pressurized fluid enters the labyrinth seal 402, 502 from the high pressure region P2 of the turbomachine, flows through the clearance across the labyrinth seal 402, 502 and exits the labyrinth seal at a greatly reduced pressure P1. The highly pressurized main flow 602 entering the labyrinth seal 402, 502 flows in an axial direction of a rotor 600 from a high pressure region to a low pressure region and includes a circumferential flow component 604, or swirl, due to rotation of the rotor 600, that flows in a direction of rotation around the circumference of the rotor 600.

As previously described with respect to FIGS. 2, 3A and 3B, swirl at the inlet to the labyrinth seal can induce destabilizing forces in the labyrinth seal that can lead to rotor instability.

However, as shown in FIGS. 6A and 6B, the plurality of grooves 404, 504 disposed in the helical pattern of the labyrinth seal 402, 502 induces an axial flow component 606 in relative velocity that flows in an axial direction opposite (counter to) the axial direction of the main flow of highly pressurized fluid entering the labyrinth seal 402, 502. The axial flow component 606 in relative velocity opposes the main flow near the labyrinth seal 402, 502 to break the swirl of the main flow near the labyrinth seal. Thus, the axial flow component 606 in relative velocity induced by the plurality of grooves 404, 504 disposed in the helical pattern acts like a swirl brake to decrease the inlet swirl thereby providing a stabilizing effect.

Thus, the rotordynamic stability of the labyrinth seal is improved with no modification to include swirl brakes in or before the labyrinth seal. Accordingly, the incorporation of the plurality of grooves 404, 504 disposed in the helical pattern in the labyrinth seals 402, 502 can provide easy, convenient and cost effective improvement in rotordynamic stability of labyrinth seals.

In addition, with respect to the device 500 of FIG. 5, flow components in the second rotoric portion 512 having the second plurality of grooves 506 disposed in the cylindrical pattern formed thereon are like those of labyrinth seal 200 as shown in FIGS. 2, 3A and 3B in which there is less leakage but more swirl and instability. However, since the amount of flow entering the second rotoric portion 512 has already been significantly reduced by the helically formed grooves of the first rotoric portion 510, there is no problem of instability in the second rotoric portion 512. In addition, the plurality of cylindrically formed grooves 506 of the second rotoric portion 512 further reduces the leakage flow the labyrinth seal 502, particularly during steady state conditions. Thus, by providing the first plurality of grooves disposed in a helical pattern and a second plurality of grooves disposed in the cylindrical pattern, a high-stability, low-leakage seal is provided.

Figure 7:
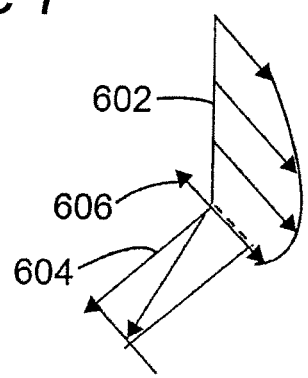
FIG. 7 is a schematic diagram illustrating swirl changes in a labyrinth seal according to exemplary embodiments.

FIG. 7 is a schematic diagram illustrating swirl changes in a labyrinth seal according to exemplary embodiments. Swirl changes occur in the labyrinth seal due to the introduction of the opposing axial flow component that opposes the main flow or in the same direction depending on the rotation wise. FIG. 7 shows a main fluid flow 602 entering labyrinth seal 402, 502 through the clearance. As shown in FIG. 7, an axial flow 606 in relatively velocity is induced by the helically formed grooves and counters the main flow 602. A direction of the axial flow 606 may be positive or negative depending on a direction of rotation of the rotor. The axial component 606 may be positive or negative depending on the helix angle. The modification of the axial component of the flow 606 decreases the tangential component 604 therefore the swirl is reduced with beneficial on rotordynamics.

FIGS. 8 and 9 are schematic diagrams of a cross-section of a portion of a modified device for sealing a high pressure region from a low pressure region in a turbomachine according to exemplary embodiments. FIGS. 8 and 9 merely illustrate the devices of FIGS. 4 and 5, respectively, in which the first and/or second plurality of grooves 404/506 are formed on the statoric portion 406 of the device. Thus, the descriptions of those devices are not repeated here. The leakage flows of the embodiments of FIGS. 8 and 9 will be similar to those of the embodiments of FIGS. 4 and 5. Thus, the devices 800 and 900 of FIGS. 8 and 9 are expected to provide the same benefits as those of FIGS. 4 and 5.

An advantage of exemplary embodiments disclosed herein is applying a low cost solution to improve rotordynamic stability. Another advantage according to exemplary embodiments is providing simple and cost-effective yet high damping, low-leakage devices for sealing in turbomachines.

Another advantage according to exemplary embodiments is applying highly stable, low leakage seals in turbomachines without having to install additional devices or perform complex drilling and/or modifications to existing turbomachines in which the seals are installed, as are required by existent solutions. Exemplary embodiments disclosed herein may be interchangeable with current designs or with only minimal modification to existing technologies. Thus, by exemplary embodiments, it is possible to retrofit existing machinery with devices for sealing in turbomachines disclosed herein that are easily manufactured, have low leakage by providing low clearances, and have high damping and high stability.

The disclosed exemplary embodiments provide devices and methods for providing high-damping sealing in turbomachines. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A device for sealing a high pressure region in a turbomachine from a low pressure region in the turbomachine, the turbomachine having one or more statoric parts and one or more rotoric parts, the device comprising:
   a labyrinth seal comprising a first plurality of grooves and a second plurality of grooves, the first plurality of grooves being disposed in a helical pattern and the second plurality of grooves being disposed in a cylindrical pattern, the labyrinth seal being disposed between at least one of the one or more rotoric parts of the turbomachine and at least one of the one or more statoric parts of the turbomachine between the high pressure region and the low pressure region of the turbomachine,
   wherein the helical pattern has a helix angle less than or equal to 10°, wherein a stabilization effect of the turbomachine is obtained and leakage due to the second plurality of grooves is negligible.

2. The device of claim 1, wherein the second plurality of grooves comprises at least five grooves.

3. The device of claim 1, wherein the first plurality of grooves is adjacent to the second plurality of grooves.

4. The device of claim 3, wherein the first plurality of grooves is directly adjacent to the second plurality of grooves.

5. The device of claim 1, wherein the labyrinth seal comprises a first clearance in the zone where the first plurality of grooves are located, and a second clearance in the zone where the second plurality of grooves are located, wherein a ratio between the first clearance and the second clearance is less than or equal to 2 and more than or equal to 0.5.

6. The device of claim 5, wherein the ratio between the first clearance and the second clearance is approximately equal to 1.

7. The device of claim 1, wherein the first plurality of grooves and the second plurality of grooves are both associated either to the one or more rotoric parts or the one or more statoric parts.

8. The device of claim 1, wherein the labyrinth seal further comprises:
- a first rotoric portion on which the first plurality of grooves being disposed in the helical pattern is formed; and
- a second rotoric portion disposed adjacent to the first rotoric portion and on which the second plurality of grooves disposed in the cylindrical pattern is formed, wherein:
  - the first rotoric portion is disposed on the at least one of the one or more rotoric-parts of the turbomachine in the high pressure region of the turbomachine,
  - the second rotoric portion is disposed on the at least one of the one or more rotoric parts of the turbomachine in the low pressure region of the turbomachine, and
  - the first rotoric portion and the second rotoric portion are disposed opposite to and in sealing relation with the at least one of the one or more statoric parts of the turbomachine.

9. The device of claim 8, wherein the first rotoric portion rotates in a same direction as a direction of rotation of the second rotoric portion.

10. The device of claim 8, wherein the first rotoric portion and the second rotoric portion are made of two separate parts.

11. The device of claim 10, wherein the rotoric and statoric portions are independent.

12. The device of claim 8, further comprising:
- a statoric portion coated in an abradable material and disposed on the at least one or more statoric parts of the turbomachine opposite to and in sealing relation with the first and the second rotoric portions of the labyrinth seal.

13. The device of claim 1, wherein the labyrinth seal comprises:
- a statoric portion disposed on the at least one of the one or more statoric parts of the turbomachine between the high pressure region and the low pressure region of the turbomachine, wherein:
  - the first plurality of grooves is formed on the statoric portion in the high pressure region of the turbomachine,
  - the second plurality of grooves is formed adjacent to the first plurality of grooves on the statoric portion in the low pressure region of the turbomachine, and
  - the statoric portion is disposed opposite to and in sealing relation with the at least one of the one or more rotoric parts of the turbomachine.

14. The device of claim 13, further comprising:
- a rotoric portion disposed on the one or more rotoric parts of the turbomachine opposite the statoric portion of the labyrinth seal.

15. The device of claim 1, wherein the helical pattern has a helix angle between 0.5° and 5°.

16. The device of claim 15, wherein the second plurality of grooves comprises at least five grooves.

17. The device of claim 15, wherein the first plurality of grooves is adjacent to the second plurality of grooves.

18. The device of claim 15, wherein the labyrinth seal comprises a first clearance in the zone where the first plurality of grooves are located, and a second clearance in the zone where the second plurality of grooves are located, wherein a ratio between the first clearance and the second clearance is less than or equal to 2 and more than or equal to 0.5.

19. The device of claim 15, wherein the first plurality of grooves and the second plurality of grooves are both associated either to the one or more rotoric parts or the one or more statoric parts.

20. The device of claim 2, wherein the first plurality of grooves is adjacent to the second plurality of grooves.

* * * * *